United States Patent [19]

Miller

[11] 4,128,310
[45] Dec. 5, 1978

[54] ZOOM MIRROR

[76] Inventor: John Miller, 2361 Cove Ave., Los Angeles, Calif. 90039

[21] Appl. No.: 803,626

[22] Filed: Jun. 6, 1977

Related U.S. Application Data

[63] Continuation of Ser. No. 622,249, Oct. 14, 1975, abandoned.

[51] Int. Cl.² .............................................. G02B 5/10
[52] U.S. Cl. ................................................. 350/295
[58] Field of Search ................ 350/295, 179; 343/915

[56] References Cited

U.S. PATENT DOCUMENTS

| 504,890 | 9/1893 | Ohmart | 350/179 |
| 3,254,342 | 5/1966 | Miller | 350/295 X |
| 3,610,738 | 10/1971 | Bochmann | 350/295 |

FOREIGN PATENT DOCUMENTS 1143034   9/1957   France ..................................... 350/295

OTHER PUBLICATIONS

Traub, American Journal of Physics, vol. 35, No. 6, Jun. 1967, pp. 534 and 535.

*Primary Examiner*—F. L. Evans
*Attorney, Agent, or Firm*—Albert M. Herzig; Edward C. Walsh

[57] ABSTRACT

A variable mirror having a reflecting surface which can be formed to have a curved, that is, a convex or concave contour to provide variable degrees of magnification. The mirror is adapted for utilization in a compact or vanity case, or the like. Various mechanisms are provided for varying the degree of curvature and magnification of the mirror, these means preferably being manually actuatable.

4 Claims, 17 Drawing Figures

U.S. Patent    Dec. 5, 1978    Sheet 1 of 3    4,128,310
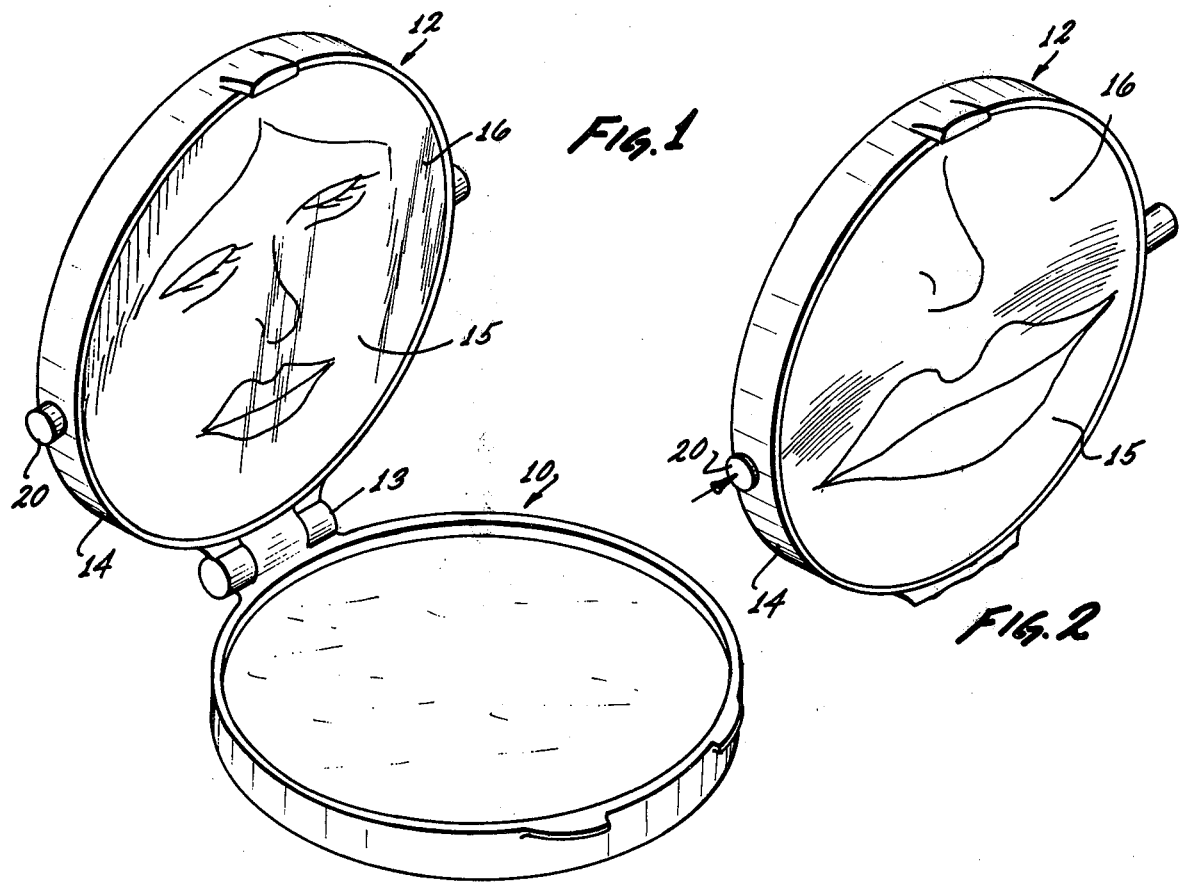
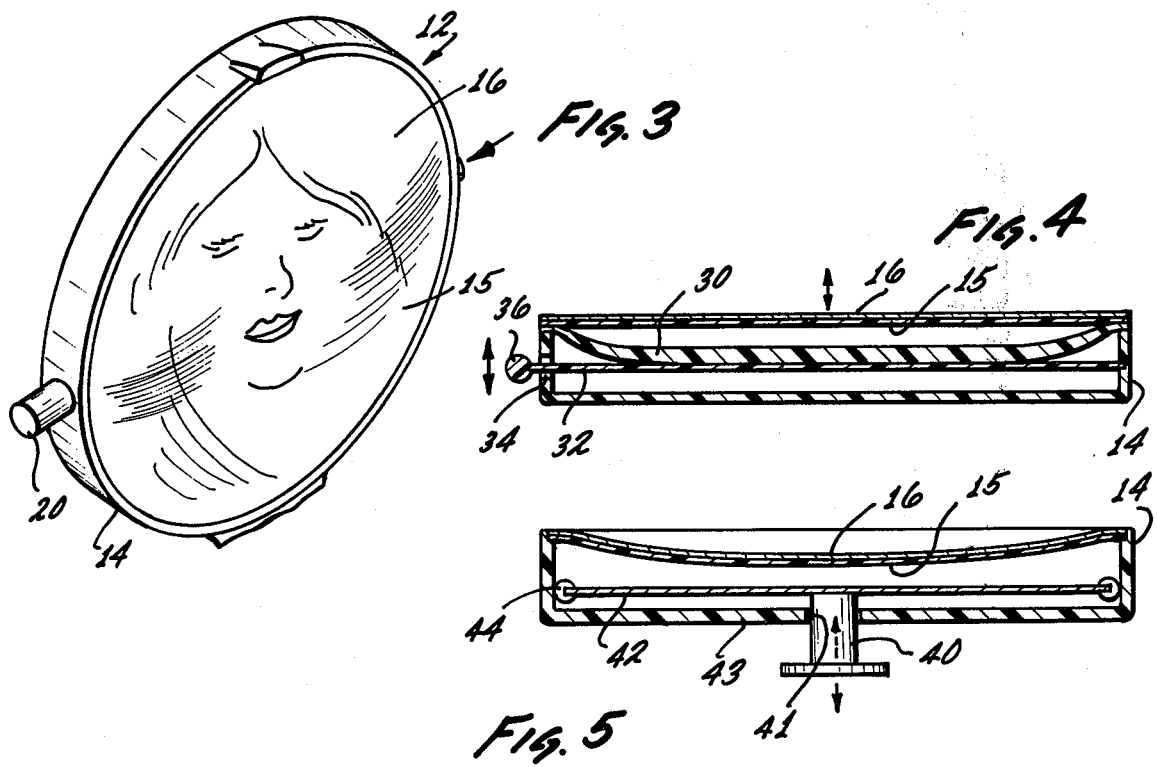

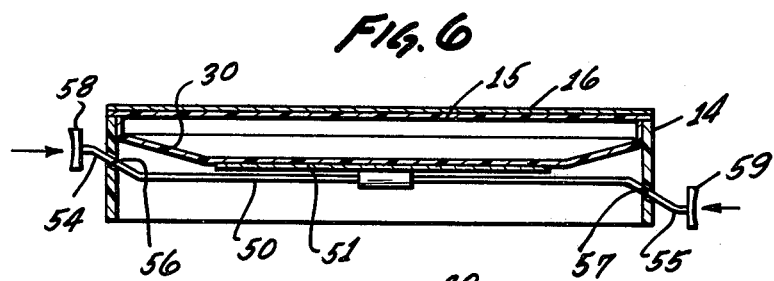
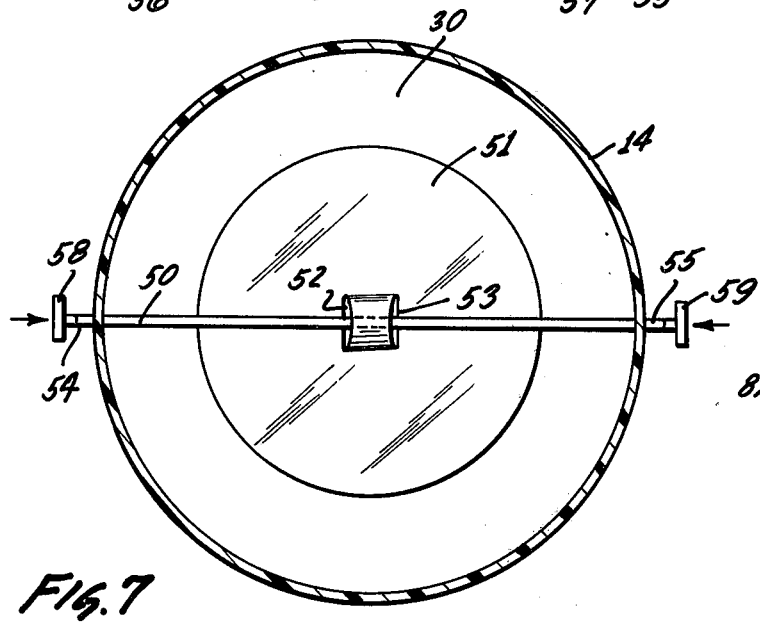
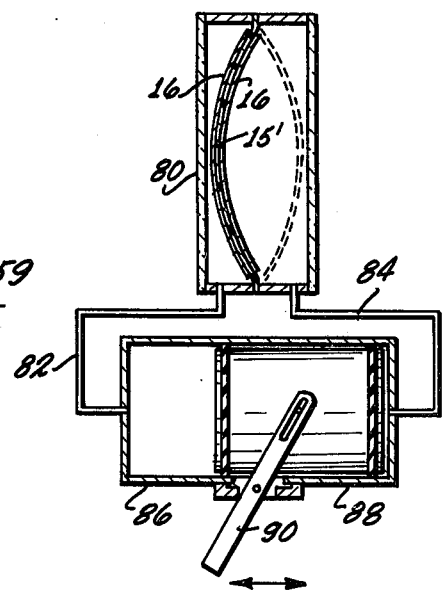
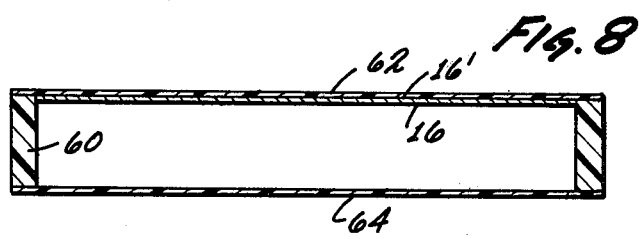
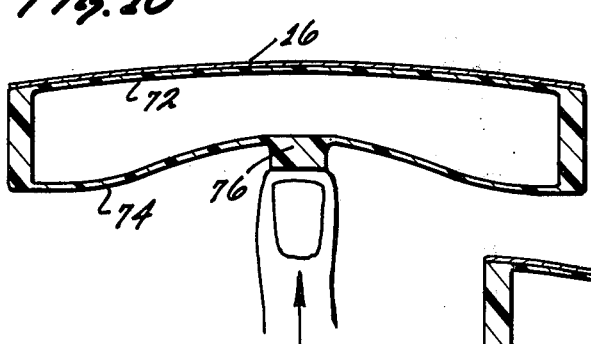
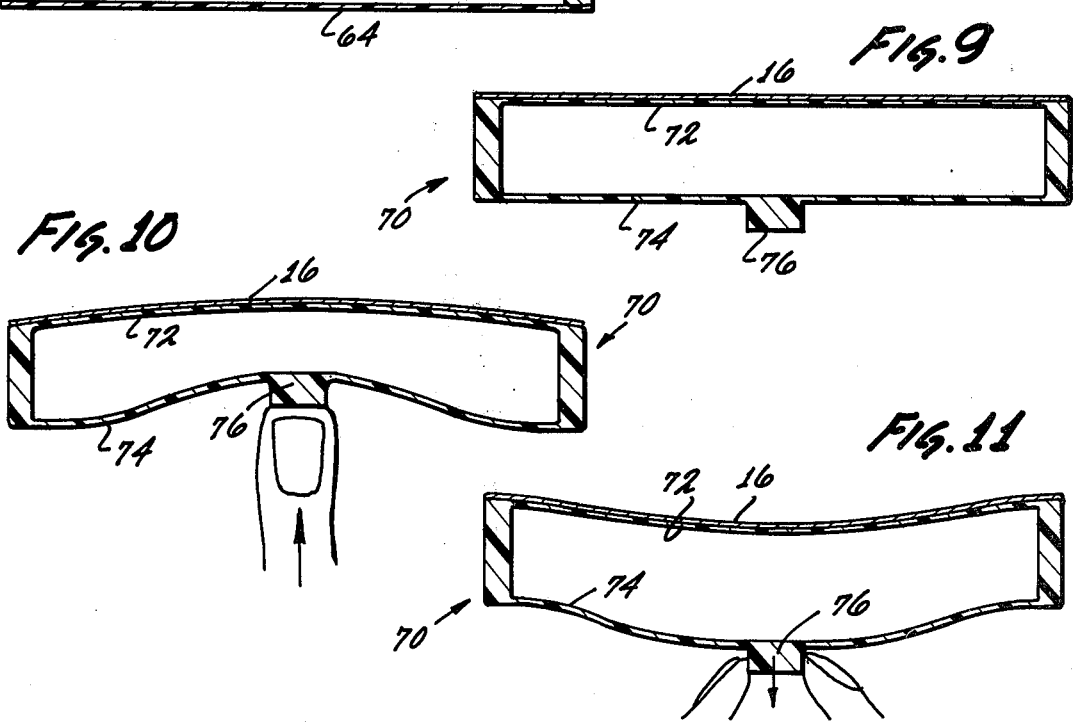
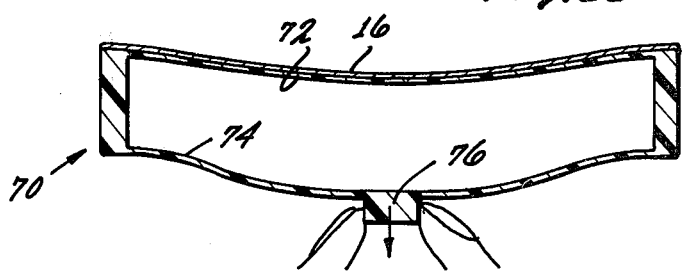

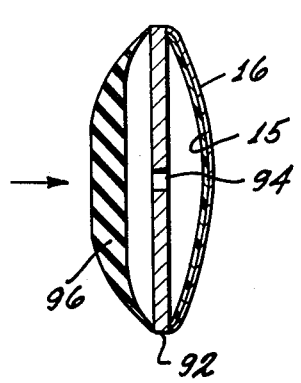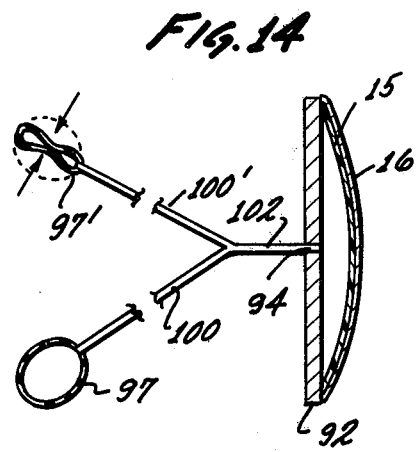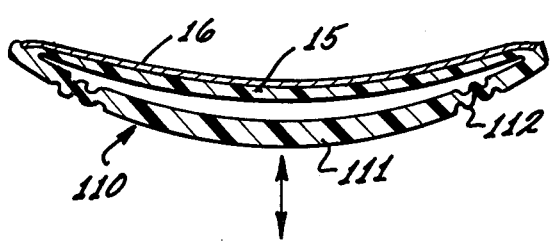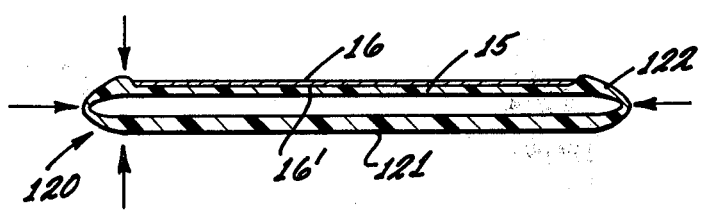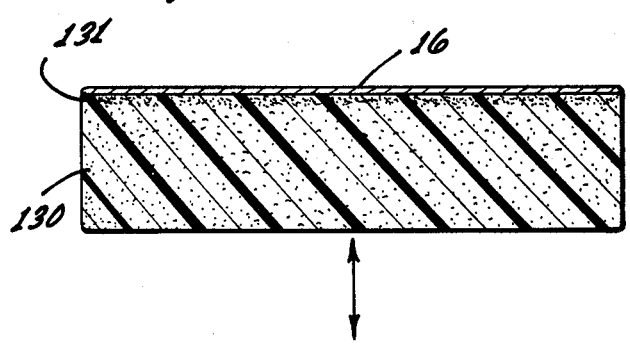

ZOOM MIRROR

This is a continuation of application Ser. No. 622,249 filed on Oct. 14, 1975 now abandoned.

BACKGROUND OF THE INVENTION

Field of the Invention

The field of the invention is that of mirrors or reflectors having the capability of being deformed in varying degrees to have a curved, generally spherical contour to provide varying degrees of magnification.

Mirrors of the general type have been known in the prior art in patents including U.S. Pat. Nos. 1,910,119; 2,403,915; 2,555,387; 2,733,637; 3,054,328; 3,610,738; 3,527,527; and 3,623,793. The prior art offers only a few variable designs having distinct limitations. Some designs are characterized by inherent limitations of minimum and maximum deflections, diameters, thickness, overall size or general configuration, and therefore are of limited utility. Further, the prior art is characterized by a relative lack in simplicity of design, construction and actuating means with the result that they are comparatively expensive to manufacture. The herein invention offers the means to overcome the aforesaid deficiencies as described in detail hereafter.

SUMMARY OF THE INVENTION

The invention relates generally to curvature forming mechanisms, and more particularly to such mechanisms embodied in variable reflectors and mirrors. Mirrors and/or reflectors of various forms are useful and necessary items in connection with many human activities. Examples include cosmetic or shaving mirrors, rear and sideview mirrors for vehicles and in passageways and other areas as well. They appear as parts of telescopes, cameras, radiation devices and various types of toys, among many other and varied uses.

Typically, mirrors are made plane and non-flexible. When other than the normal functions are desired, such as magnifying or wide angle capabilities, typically these functions are not realized in simple or effective ways. With respect to the prior art designs available, some are only unidirectional.

The invention as disclosed in the exemplary embodiments described in detail herein offer a form of frame constructed to hold a deformable reflecting member. Specific manually actuatable devices are provided for realizing the variable deformation of the reflecting member. Additionally, volume displacement means are disclosed for purposes of achieving the deformation of the reflecting member.

In the light of the foregoing, it is a primary object of the invention to overcome all the deficiencies and limitations of the prior art and to provide simple, basic and practical forms of devices embodying the concepts of deformation of the reflecting surface for variable magnification or reduction.

It is a further object of the invention to provide a basic, simplified, efficient, effective, economical reflecting body of variable shape and/or contour.

Another object is to provide a multidirectional, infinitely variable curvable reflecting member adaptable for many useful, practical and beneficial applications.

A further object is to provide a mirror or reflecting surface as referred to that is changeable in curvature or contour so that it is capable of magnifying or diminishing the reflected image to any degree desired.

Another object is to provide a variable mirror characterized in that the mechanism is able to realize infinite variations inherently capable of progressing smoothly in either direction, the progression being immediately reversible.

A further object is to provide a variable mirror as referred to that can be thinner than the standard mounted mirrors commonly in use.

A further object is to provide simplified, versatile, adjusting devices that include the characteristics of being rugged-like, compact, shockproof, shatterproof, unbreakable and capable of being operated by or with gas, liquid, magnetism or other suitable means. Also, that the devices can be constructed in any desirable practical size or shape; of a large variety of materials singly or in combination; that can be fabricated by being molded, cast, or otherwise, entirely in one piece, having the capability to function under water, in outer space or in any environment. Further that the devices are inherently safe and easy to operate by reason of the particular design, materials and modes of operation.

Further objects and additional advantages of the invention will become apparent from the following detailed description and annexed drawings.

BRIEF DESCRIPTION OF THE DRAWINGS

FIG. 1 is a pictorial view of a compact having the reflecting mirror of the invention embodied therein;

FIG. 2 is a view of the reflecting element of FIG. 1 in a position for magnification.

FIG. 3 is a view of the reflecting element of FIG. 1 in a position for reduction of the image.

FIG. 4 is a sectional view of a modified form of the invention.

FIG. 5 is a sectional view of another modified form of the invention.

FIG. 6 is a sectional view of another modified form of the invention.

FIG. 7 is a bottom view of the device of FIG. 6.

FIG. 8 is a sectional view of a modified form of the invention.

FIGS. 9, 10 and 11 are sectional views of another modified form of the invention.

FIG. 12 is a section view of another modified form of the invention.

FIGS. 13 and 14 are sectional views of modified forms of the invention.

FIGS. 15, 16 and 17 are sectional views of modified forms of the invention.

DETAILED DESCRIPTION OF THE PREFERRED EMBODIMENTS

Having reference to FIGS. 1–3, the invention in the exemplary form shown is embodied in a compact of circular shape having a bottom part 10 and a circular cover part 12, the parts being hinged together by a hinge as shown at 13.

Cover 12 has an annular ring-shaped sidewall 14 as may be seen in FIGS. 2 and 3 which supports the reflecting diaphragm 15 as shown, its peripheral edges being sealed to the support 14. The outer surface of the diaphragm 15 is a mirror and it may be constructed of various different materials as known in the art, such as metal foil or resilient plastic, including metallized Mylar, cellophane, polyethylene, and cellulose acetate.

The compact 10 may otherwise be of conventional construction other than as described herein. Numeral 20 designates a manual actuator for deforming the mirror for magnification as in FIG. 2 or reduction as in FIG. 3. Actuator 20 will be described presently.

FIG. 4 shows a form of the invention having a flexible diaphragm 30 peripherally sealed to the support 14 and to the element 15 which is the resilient reflectively coated membrane or diaphragm. Diaphragm 15 is sealed and joined to the periphery of the diaphragm 30 and supported and under tension, if necessary, to normally present a plane mirror surface. An air space is left between the sealed members 15 and 30 to prevent distortion causing contact and provide a fluidic coupling effect between them. Thus, when the driving diaphragm 30 is actuated, the reflective plastic membrane 15 being fluidly joined thereto and influenced by atmospheric pressure is therefore driven to form a concave or convex mirror surface. Upon reduction of the actuating force, the resilient membrane 15 returns to a plane surface.

The space between members 15 and 30 can be filled with liquid to prevent loss of motion due to air compression or expansion.

Preferably diaphragm 30 as shown is made thinner for flexibility near the peripheral edges, the thickness for rigidity tapering from the center part which is of uniform thickness toward the edges. The center part is rigid and the peripheral parts are flexible.

Numeral 32 designates a stem member connected at one end to the inside of holder 14 and extending out through opening 34 in the side of holder 14. On its end is knob 36. Within the holder it is attached to diaphragm 30. The knob 36 can be pressed downwardly or upwardly to thereby pull down or upwardly on the diaphragm 30 to vary the pressure in the space between the diaphragm 30 and membrane 15, the fluid coupling effect thereby deflecting the membrane 15 from a plane surface to provide a concave or convex surface.

FIG. 5 shows another modification. In this form of the invention, there is a stem 40 connected to rigid disc 42, the stem extending through an opening 41 in the bottom 43 of the holder 14. Numeral 44 designates a sealing member at the periphery of disc 42 which seals to the inside of holder 14 allowing sliding relative movement. By pressing or pulling on the member 40, the pressure between the diaphragms can be varied to control the contour of the mirror surface by moving the fluid between the diaphragms.

FIGS. 6 and 7 show a modified form of the invention. Numeral 50 designates a stem in sliding coupling centrally through a disc 51 fixed to the diaphragm 30. It extends and slides through openings 52–53 in disc 51. It has upwardly and downwardly offset end parts 54 and 55 which extend through openings 56 and 57 in the sides of holder 14. Numerals 58 and 59 are buttons or knobs on the ends of stem 50. By pushing on either knob 58 or 59, the parts 54–55 are cammed in openings 56–57 to translate stem 50 and disc 51 upwardly or downwardly to similarly move diaphragm 30 and through the coupling to correspondingly move the diaphragm 15.

FIG. 8 shows a simple modified form of the invention wherein both diaphragms are of transparent resilient flexible material such as Mylar polyester film or other suitable material. The wall 60 is preferably circular and of rigid plastic or other suitable material. One diaphragm 62 is mirrored by aluminizing on one surface, preferably the inward enclosed side. The Mylar film protects the mirror coating from handling or other damage. The aluminized coating 63 is a mirror on both sides. The outer side is visible through the transparent Mylar film. When an edge, or any part of the clear diaphragm 64 is pressed or deformed, the resulting enclosed fluid pressure deforms the opposite diaphragm 62 outwardly; the mirror surfaces are thus driven simultaneously concave-convex, appearing concave when viewed through the driving diaphragm 64, and convex when viewed from its opposite side 62.

FIGS. 9–11 show a modified form of the invention wherein the entire device is formed by molding or otherwise as an integrated unit of suitable material such as plastic. Preferably, it is circular having a wall 70 and end diaphragms 72 and 74. One diaphragm 72 is mirrored. Force may be applied to the other to deform the mirror through the coupling. In FIGS. 9–11, the unit has knob 76 which can be pushed or pulled as shown. Thus, member 72 is caused to form a convex surface as in FIG. 10 or concave as in FIG. 11.

FIG. 12 shows a modified form of the invention which is actuated by volume displacement. Diaphragm 15' is within holder 80. The spaces on opposite sides of the diaphragm are connected by tubes 82 and 84 to ends of cylinder 86 having in it piston 88. Piston 88 is actuatable by pivoted manual arm 90 toward one end or the other of cylinder 86 to vary the fluid volume ratio on each side of the diaphragm 15' so as to deform it one way or the other. Thus, the curvature is varied by relative displacement of fluid. Diaphragm 15' is mirrored on both sides and the sides of holder 80 are transparent so diaphragm 15' can be viewed from either side.

FIGS. 13 and 14 show modified forms wherein a plane rigid supporting disc 92 preferably circular and having a small central hole 94 for passage of the contained fluid coupling medium, is between the mirrored membrane 15 and the driving member. In FIG. 13 the driving member is diaphragm 96 which is thinner at the periphery like diaphragm 30, FIG. 4. These configurations are meant for use as a rear view mirror for vehicles and like applications. Actuation may be manually and remotely accomplished by hand, foot, turn signal lever coupling, cable, solenoid or the like.

In FIG. 14, the actuation is by way of squeeze bulb 97 and/or 97' connected by flexible tubes 100, 100' and 102 to hole 94. The advantageous and necessary limitation of these configurations are: as the mirror may be driven from its normal plane form to a convex wide angle viewing form, the disc 92 prevents the membrane from forming a concave, magnifying mirror. In a concave mirror, distant images appear out of focus, or inverted. A concave rear view mirror is therefore undesirable and indeed dangerous.

FIG. 15 shows a modified form of the invention that is molded or otherwise as a complete unit 110 of plastic or other suitable material. It includes bowed member 111 having corrugations 112 and 112' and integral diaphragm 15. It may have a knob like knob 76 of FIGS. 9–11. The corrugations 112 and 112' allow movement of members 111 toward and away from diaphragm 15. The coupling medium is air or any desired type or quantity of fluid matter, which may be inserted, changed or adjusted by hypodermic or like methods. The unit is of self-sealing material or may be sealed by any of several well-known methods to the art. The driving part 111 forms to a generally paraboloidal shape to avoid any distorting contact with the mirror 15 in concave formation. The extending periphery of part 111 provides protection to the mirror part 15.

FIG. 16 shows a form of the invention fabricated of transparent plastic or other suitable material, and like FIG. 15, is made of a single integral piece 120. It resembles a section of modified bellows and operates on similar principles. Diaphragm 15 is opposite thicker, more rigid wall 121, the diaphragm and wall 121 being joined by the peripheral part having a section as designated at 122. Force applied across the major diameter causes the minor diameter to increase, thereby increasing the enclosed volume, thus decreasing its relative pressure. The pressure differential causes the thin membranous mirrored 15 section to deform inwardly, effectively concave, when viewed from the top. Force applied across the minor diameter, preferably near the periphery, produces opposite results.

FIG. 17 shows a sectional view of a variable reflector device that is molded, cast or otherwise in the shape of a solid cylinder (i.e., disc) 130, of homogenous material such as a foamed plastic elastic substance. The surface portion 131 is cast or otherwise processed to have somewhat greater density and stiffness than the body of the disc and having the necessary smooth and normally plane mirrored surface 15 able to present a well-figured variable reflection. The opposite surface portion may also be formed to have greater density and stiffness. The greater density and stiffness also serve to properly transmit and/or receive applied force or pressure to cause the reflectorized surface 15 to deform concave or convex, returning to a plane when not otherwise actuated. The deformation may be accomplished as in the previous embodiments.

It is inherent in each configuration that the reflector member normally returns to a plane form if the driver member is destroyed or the actuating force is removed. In referring to the reflector member as deformable, it is intended that this term shall embrace materials having the quality or characteristic of being elastic.

From the foregoing those skilled in the art will readily understand the nature and the construction of the invention and the manner in which it achieves and realizes all of the objects as set forth in the foregoing.

The foregoing disclosure is representative of the preferred forms of the invention and is to be interpreted in an illustrative rather than a limiting sense. The invention is to be accorded the full scope of the claims appended hereto.

I claim:
1. A variable focal length mirror comprising:
   a resilient, deformable member having a reflective surface and being deformable into curved configurations;
   a second member, said second member being movable and having at least portions thereof being spaced from said first member;
   a medium between said first member and said second member providing a coupling therebetween, the second member being movable to deform the first member, through the coupling provided by the medium, to a selected curvature; and
   means attached to the first member such that the first member is prevented from assuming a concave curvature relative to the ambient.

2. The invention as set forth in claim 1 wherein said means for preventing said first member from assuming a concave curvature comprises a third member, the third member being substantially planar and non-deformable, the third member being attached to said first member to form a first space therewith and wherein said second member is attached to the third member forming a second space therewith, said first space and said second space being substantially closed to the ambient, the third member defining a conduit between said first and second spaces for passage of said medium therethrough.

3. The invention as set forth in claim 2 wherein said second member is constructed to have a greater degree of flexibility adjacent its attachment to said third member to facilitate movement of the second member.

4. The invention as set forth in claim 3 wherein said medium is a liquid.

* * * * *